(No Model.) 2 Sheets—Sheet 1.
L. B. FULTON.
GAS PRESSURE REGULATOR.
No. 339,757. Patented Apr. 13, 1886.
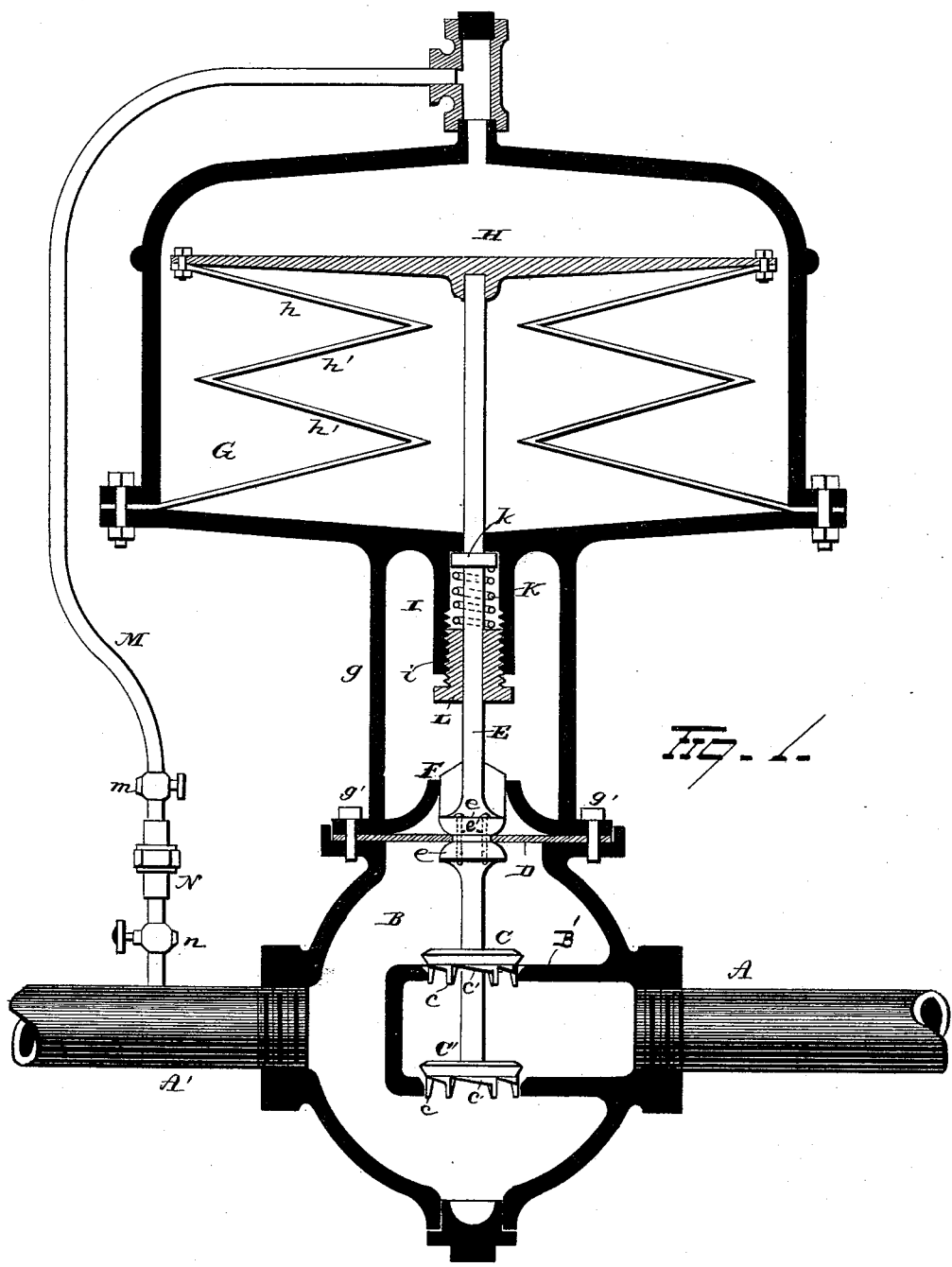
WITNESSES
INVENTOR
Louis B. Fulton

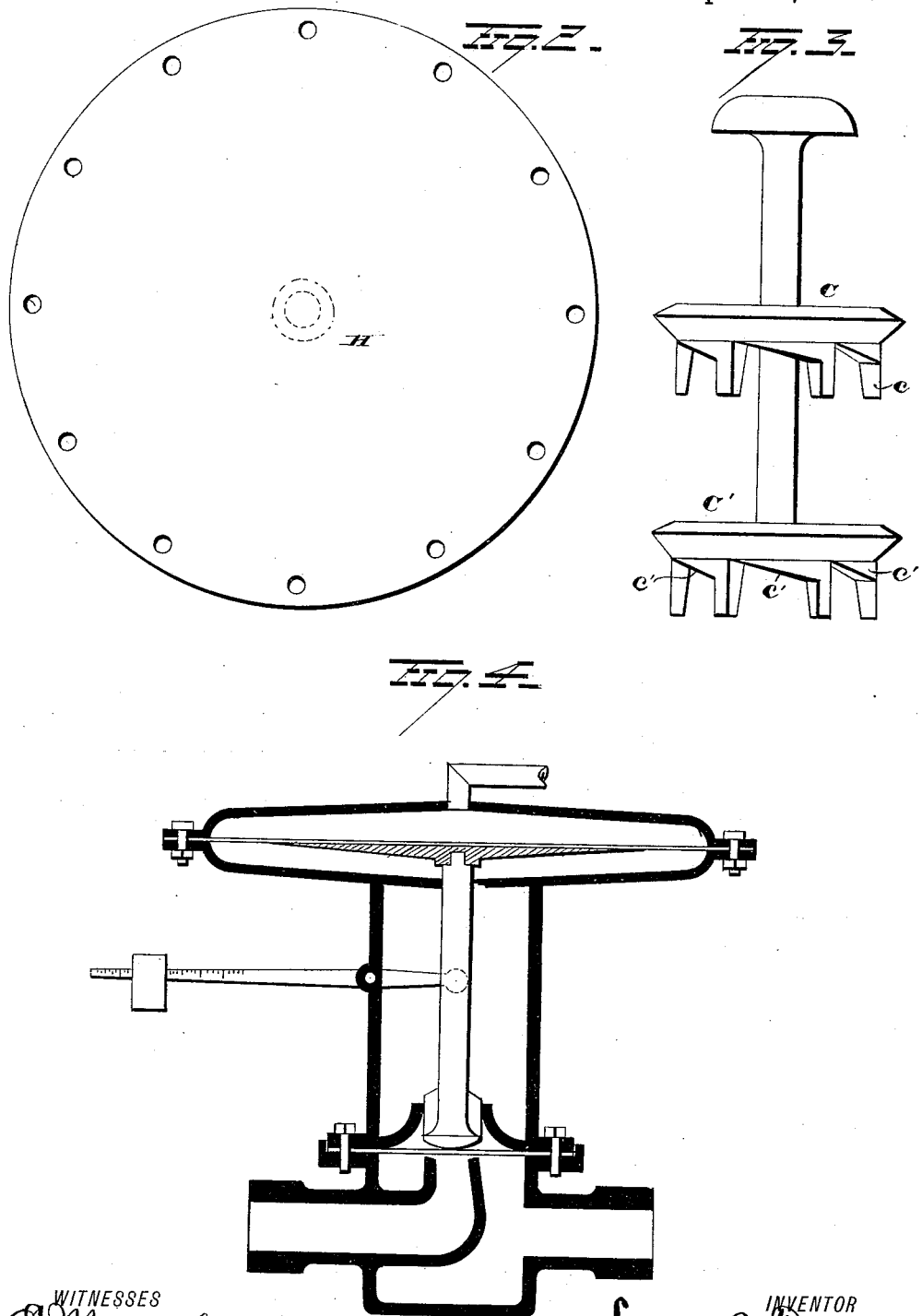

UNITED STATES PATENT OFFICE.

LOUIS B. FULTON, OF PITTSBURG, PENNSYLVANIA.

GAS-PRESSURE REGULATOR.

SPECIFICATION forming part of Letters Patent No. 339,757, dated April 13, 1886.

Application filed December 22, 1885. Serial No. 186,452. (No model.)

*To all whom it may concern:*

Be it known that I, LOUIS B. FULTON, of Pittsburg, in the county of Allegheny and State of Pennsylvania, have invented certain new and useful Improvements in Gas-Pressure Regulators; and I do hereby declare the following to be a full, clear, and exact description of the invention, such as will enable others skilled in the art to which it appertains to make and use the same.

My invention relates to an improvement in gas-pressure regulators.

Hitherto in pressure-regulators in which the pressure of the gas from the low-pressure side of the regulator-chamber acted upon an elastic diaphragm, when the pressure reached a high degree, the portion of the diaphragm between the periphery of the piston or plunger pressure-plate and the interior wall of the diaphragm-chamber was apt to assume a cup shape, and there was difficulty experienced thereby in obtaining a sufficient amplitude of vibration of the diaphragm to admit of the regulating-valve opening the distance commonly assumed as a full opening—viz., a distance equal to one-fourth of its diameter. Furthermore, the stem of the piston or plunger connecting the pressure-plate and valve has hitherto been packed, to prevent the gas from the low-pressure side of the regulator-chamber from escaping around it. This has caused considerable friction, which has been objectionable where a high degree of perfection was required in the regulator.

The object of my present invention is to provide a pressure-regulator particularly adapted to use in connection with natural gas, but adapted also to use in connection with other gases or liquids, in which the pressure-plate will admit of operating the valve any desired length of stroke with the greatest precision, and in which the friction on the piston or plunger stem will be little or nothing.

A further object is to provide a valve which, in conjunction with the sensitive pressure-plate, will admit of the most delicate regulation of the flow of gas or liquid.

With these ends in view my invention consists in certain features of construction and combinations of parts, as will be hereinafter described, and pointed out in the claims.

In the accompanying drawings, Figure 1 is a view of the pressure-regulator in vertical longitudinal section. Fig. 2 is a detached plan view of the pressure-plate. Fig. 3 is a detached view of the valve, and Fig. 4 is a modification.

A represents the feed-pipe on the high-pressure side of the regulator, and A' represents the same on the low-pressure side of the regulator. The regulator-chamber B, into which the gas or liquid from the pipe A flows, and from which the pipe A' leads, may be of any convenient shape and size. That shown in the accompanying drawings is a convenient shape and works well in practice.

B' is a chamber formed integral with or secured to the chamber B, closed at one end and open at the other, and provided on its upper and lower surfaces with openings for the escape of the gas or liquid. The end of the pipe A is connected to the open end of this chamber, or the pipe can project into the chamber B sufficiently far to admit of the seating of the valves C and C' in the upper and lower sides of the pipe, respectively. The valves have leg-guides $c$, and the rims of the valves between the legs have their lower edges inclined with respect to a horizontal plane, as shown at $c'$, the effect of which is to cause a very gradual opening as the valves are raised.

The upper portion of the chamber B is completely cut off from the rest of the chamber by a flexible diaphragm, D, of gutta-percha or other strong flexible material, and the valve-rod E, which connects the valves C C' with the pressure-plate, is provided with a rounded or beveled face, $e$, at the point where it engages the diaphragm D. Its prolongation through the diaphragm is preferably somewhat smaller than the remaining portion, and is so constructed that the diaphragm D will be tightly gripped between the ends of the valve-rod sections located, respectively, above and below it. This may be readily accomplished by providing the adjacent ends of the sections with threaded perforations, in which the connecting-bolts $e'$ work; or the end of either section might be provided with a threaded projection adapted to be received in a threaded perforation in the other.

The valve-rod extends upwardly through a perforation, F, in the top of the chamber B, and thence through a guide-sleeve into the pressure-plate or diaphragm chamber G. The chamber G is supported above the chamber B by means of a pair of pillars, g, and is removably secured thereto by a set of bolts, g', or other suitable means. The upper section of the chamber G is also removably secured to the base, and is preferably shaped substantially as shown.

Within the chamber G is located the pressure-plate H, constructed as follows: The plate H is a circular flat-faced plate of metal or other suitable rigid material, re-enforced on the under side by a gradually-increasing thickness from the edge toward the center. The plate H is supported upon a cup-shaped disk, h, provided with a central perforation. The disk h is secured at its periphery to the plate H at its periphery, the joint being made air-tight.

The disk h is supported upon a reverse cup-shaped disk, h', secured thereto at the edge of the central perforation, and the disk h' is either secured to a third disk, h', in a manner similar to that above explained with reference to the plate H and disk h, or the disk h' may be secured at its periphery to the base of the chamber. The whole forms a bellows-shaped construction capable of a vertically collapsing and expanding movement. The number of disk-sections h h', &c., employed will depend upon the distance which it is desired to move the valves.

The upper end of the piston or plunger rod is secured to the under side or in the center of the pressure-plate H, and extends downwardly within the central openings in the disks. The disks h h', &c., are preferably constructed of soft tough metal, to admit of the strain caused by the partial opening and closing of the pairs of disks without serious wear or injury.

To sustain the pressure-plate in a normally-elevated position and hold the valves normally open, a hollow boss, I, is provided, extending downwardly from the base of the chamber G, and provided with an internal thread, i, in which boss is located a spiral spring, K, embracing the piston or plunger rod, and bearing at its upper end against a flange or shoulder, k, on the piston or plunger rod, and at its lower end on the upper end of the guide-sleeve L. The latter is threaded to engage the thread in the boss I, and the tension of the spring K may be regulated with great nicety by screwing the sleeve L up or down. The piston or plunger rod works freely in its several bearings, none of them being exposed to the gas or liquid, and hence requiring no packing.

The upper section of the chamber G is connected with the low-pressure side of the regulator-chamber B by a conduit, M. The latter is provided with a union-joint, N, on either side of which is located a stop-cock, m and n, for example. By this construction the upper section of the chamber G and the conduit connected therewith may be removed without disturbing the other parts of the regulator.

As the pressure is communicated to the chamber G, when it reaches a degree higher than is desired, and higher than the spring K is set to counteract, the pressure-plate H will gradually descend, and close the valves to a point where the pressure will be reduced to the desired degree. The pressure within the chamber G will act upon the upper and under sides of the disks h h', &c., as well as upon the face of the pressure-plate; but since the disks h h', &c., expose the same area of under surface that they do of upper surface, the upward and downward pressures will balance each other, and the pressure on the face of the plate H will alone act in closing the valve.

The matter of relieving the valve-rod from friction due to stuffing-boxes is quite important, since it was impossible to obtain a constant pressure where the rod was working sometimes easier and sometimes harder, according as the packing in the stuffing-box was somewhat worn or fresh, and it is of the utmost importance that there should be no escape of the natural gas, the same being almost odorless, and therefore exceedingly dangerous, as it gives little or no warning of its presence.

The modification shown in Fig. 4 consists in employing a lever and weight in place of the spring K, to hold the valves in a normally-open adjustment and the pressure-plate elevated, and also shows a simple arrangement of the feed-pipe A within the chamber B, by means of which the valves C C' may be dispensed with, and the diaphragm D made to serve the purpose of a valve. Its operation will be readily understood and needs no further explanation.

It is evident that slight changes might be resorted to in the form and arrangement of the several parts described without departing from the spirit and scope of my invention; hence I do not wish to limit myself strictly to the construction herein set forth; but, Having fully described my invention, what I claim as new, and desire to secure by Letters Patent, is—

1. In a gas-pressure regulator, the combination, with high and low pressure pipes, a valve for regulating the supply from the high-pressure pipe to the low-pressure pipe, a vibrating pressure-plate located within a chamber, and a pipe connecting said chamber with the low-pressure pipe, of a valve-rod connecting the valve and vibrating pressure-plate, the said valve-rod being free from engagement with packing.

2. In a gas-pressure regulator, the combination, with a vibrating pressure-plate located in a chamber communicating with the low-pressure pipe, of a flexible diaphragm stretched across the chamber in which the regulating-valve is located, and a piston-rod extending from the pressure-plate to the said diaphragm, and adapted to communicate the movements of the pressure-plate to the diaphragm, substantially as set forth.

3. In a gas-pressure regulator, the combination, with high and low pressure pipes opening into a chamber, a regulating-valve located within said chamber, and a valve-regulating plate located outside of said chamber, of a flexible diaphragm located between the valve and the valve-regulating plate, substantially as set forth.

4. The combination, with a vibrating pressure-plate, a piston-rod, and a regulating-valve adapted to be operated thereby, of a spring located within an inclosed chamber and having a bearing against the piston-rod, and adapted to hold the pressure-plate and valve in a normally-elevated adjustment, and means for regulating the tension of the spring, substantially as set forth.

5. The combination, with high and low pressure pipes communicating with a chamber, and a regulating-valve located within said chamber, of a pressure-chamber in communication with the low-pressure pipe, a pressure-plate located within said pressure-chamber, a bellows-shaped vertically-yielding cushion connecting the pressure-plate with the walls of the pressure-chamber, and means for communicating the movements of the pressure-plate to the valve, substantially as set forth.

6. In a gas-pressure regulator, the combination, with a pressure-plate and a bellows-shaped cushion connecting the pressure-plate with the walls of the pressure-chamber, of a valve-operating rod leading from the lower side of the pressure-plate to the regulator-valve, and a conduit connecting the pressure-chamber with the low-pressure pipe, substantially as set forth.

7. The combination, with high and low pressure pipes communicating with a chamber, and a valve located within said chamber, and provided with one or more inclines on the lower edge of its rim, of a pressure-chamber in communication with the low-pressure pipe, a pressure-plate located within said pressure-chamber, and a valve-rod connecting the pressure-plate and valve, substantially as set forth.

8. The combination, with high and low pressure pipes opening into a chamber, a valve located within said chamber, a pressure-chamber, a pressure-plate located therein, and a valve-rod connecting the pressure-plate and valve, of a flexible diaphragm located between the valve and pressure-plate and closely embracing the valve-rod, substantially as set forth.

In testimony whereof I have signed this specification in the presence of two subscribing witnesses.

LOUIS B. FULTON.

Witnesses:
ROBERT A. COCHRAN,
M. F. CASSIDY.